March 31, 1964  L. NEWHOUSE ETAL  3,127,582
SEQUENCE COUPLED ROTARY ELECTRICAL DEVICES
Filed May 5, 1961  4 Sheets-Sheet 4
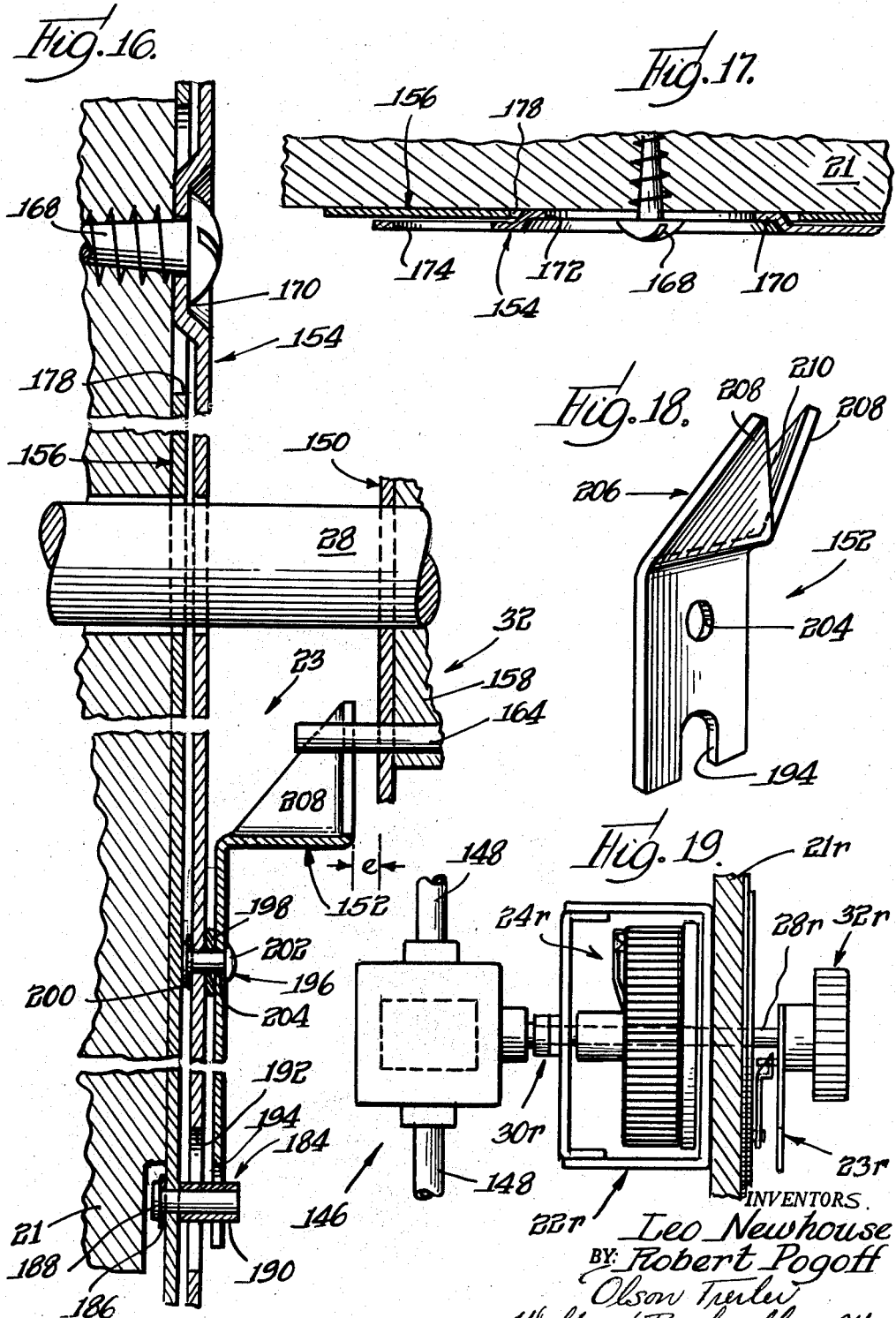
INVENTORS.
Leo Newhouse
BY: Robert Pogoff
Olson Trevler
Wolters & Bushnell Attys.

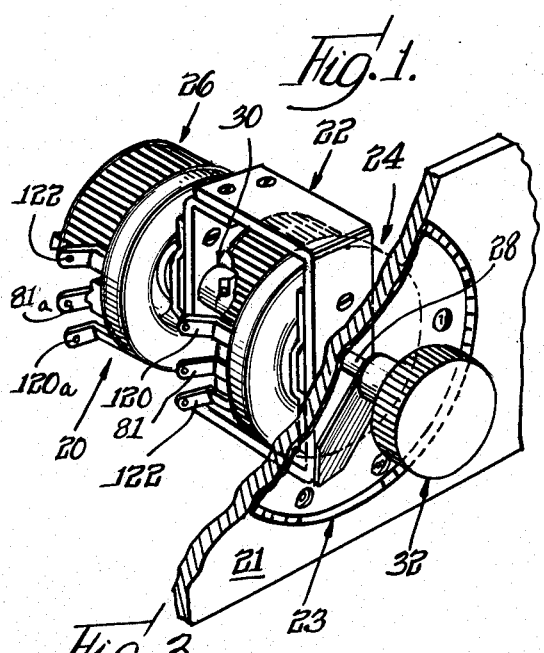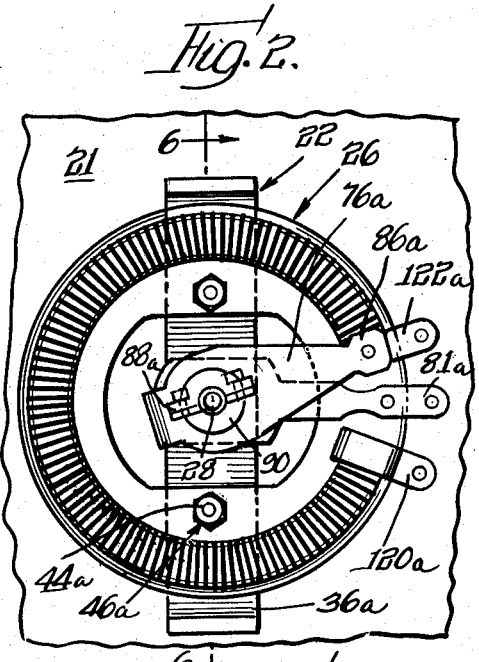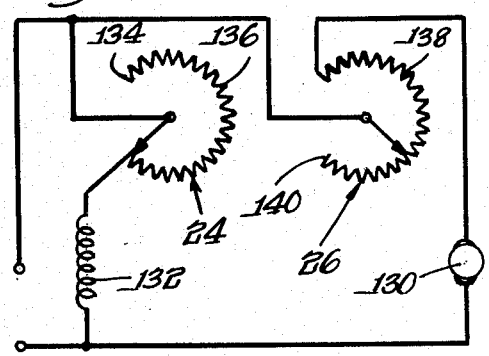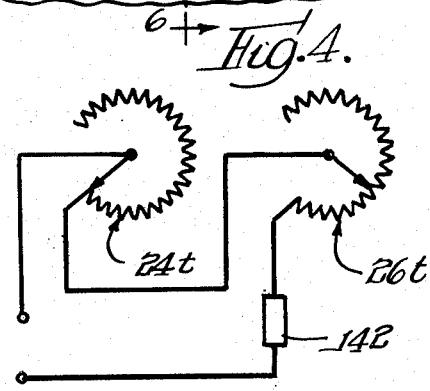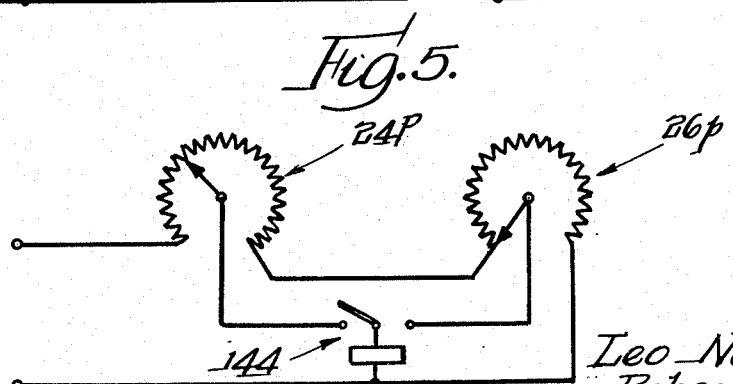
INVENTORS
Leo Newhouse
Robert Pogoff
By: Olson, Trexler, Wolters & Bushnell
attys

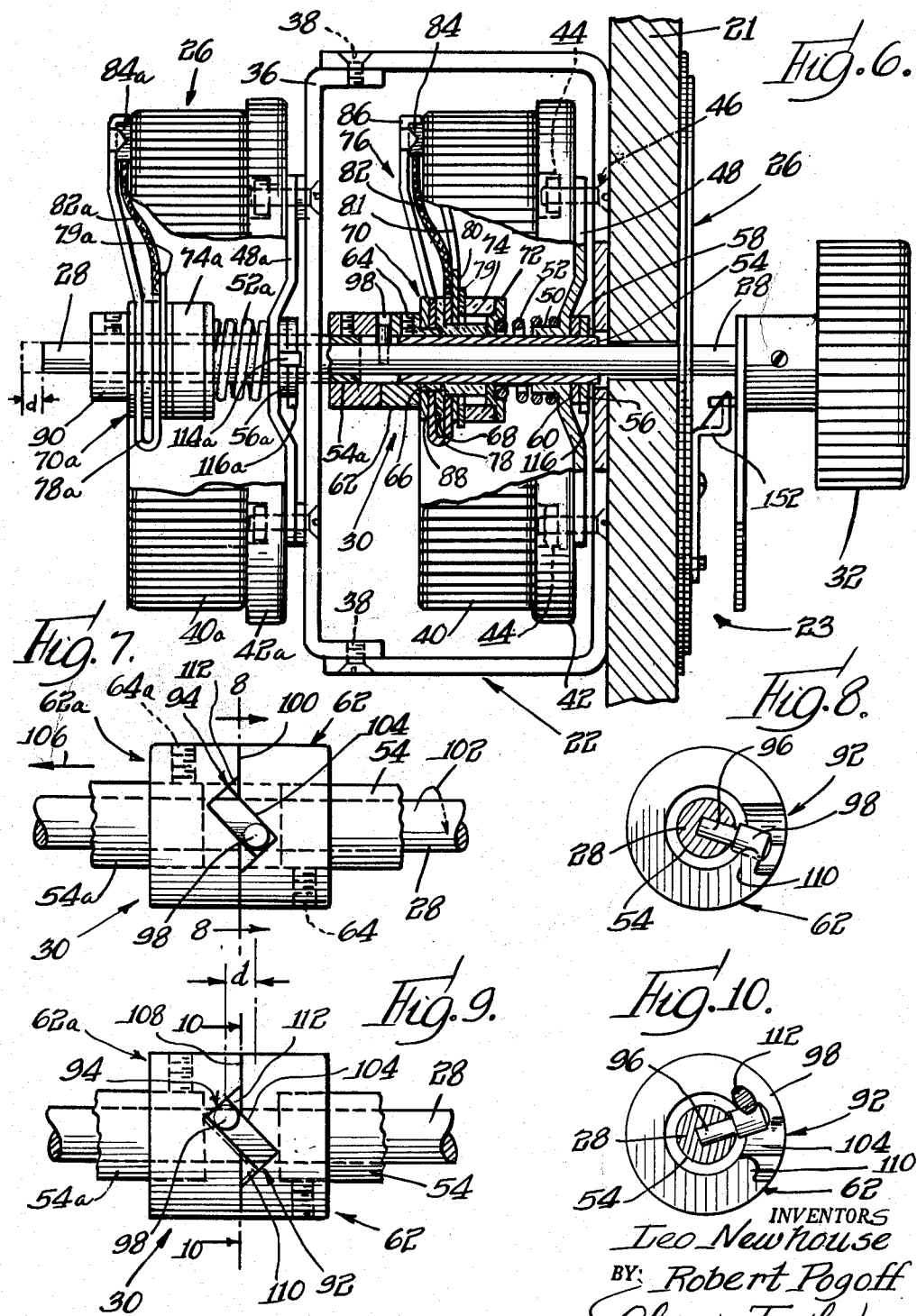

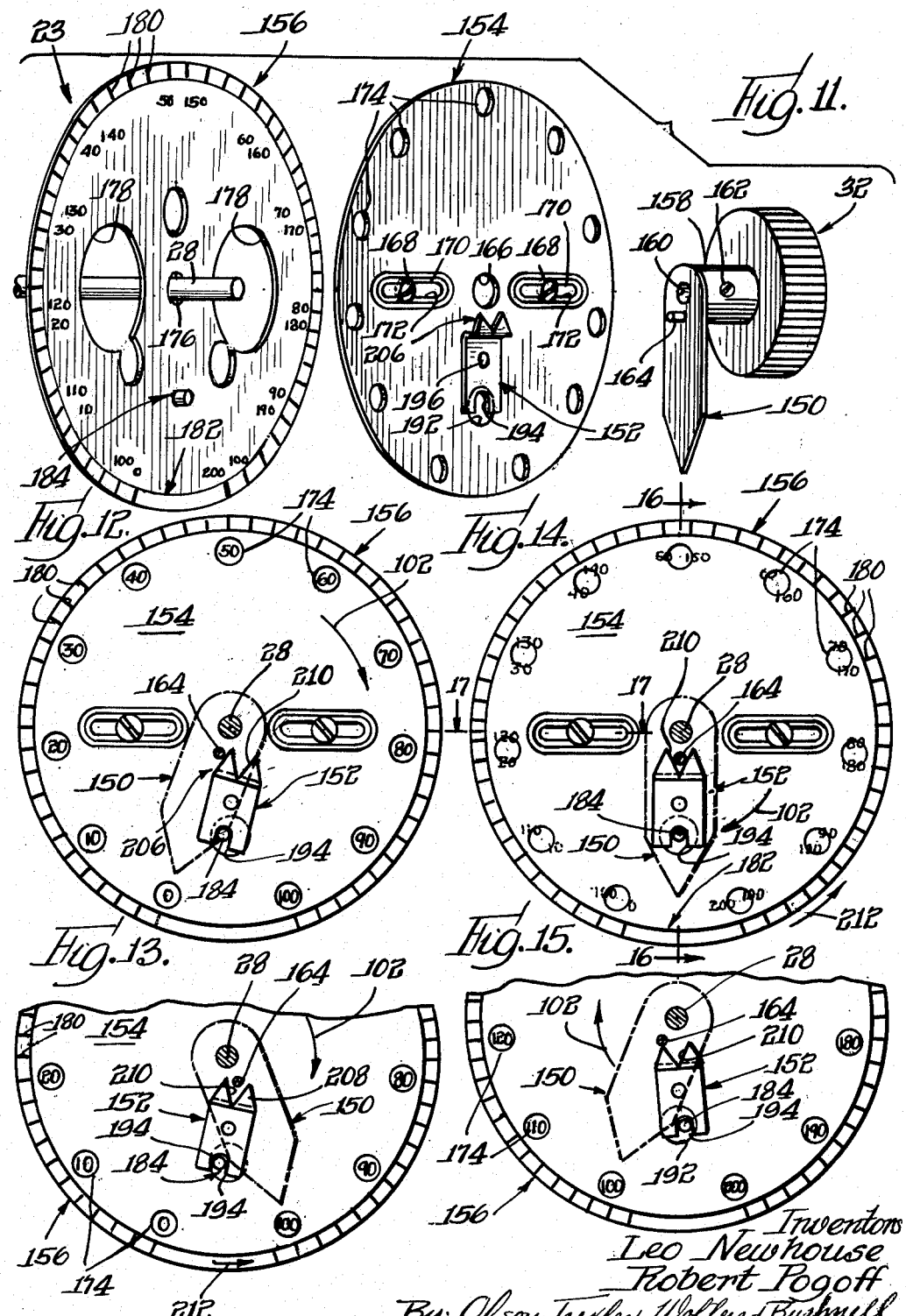

United States Patent Office 3,127,582
Patented Mar. 31, 1964

3,127,582
SEQUENCE COUPLED ROTARY ELECTRICAL DEVICES
Leo Newhouse, Mount Prospect, and Robert Pogoff, Skokie, Ill., assignors to Ohmite Manufacturing Company, Skokie, Ill., a corporation of Illinois
Filed May 5, 1961, Ser. No. 108,168
19 Claims. (Cl. 338—129)

This invention relates generally to rotary electrical devices and especially to sequence coupled rotary electrical devices.

This application is a continuation-in-part of our copending application Serial No. 4,708, filed January 26, 1960, now abandoned.

What is meant throughout the present specification and claims by the terms "sequence coupled," "coupled in sequence" and the like is an arrangement of two or more rotary devices in which a shaft rotation is made to operate in succession each of the devices through its full angle of travel. For example, by rotating a shaft in one direction, a first unit is made to turn through its full angle of travel while a second unit remains at rest. When the first unit reaches the end of its travel, the second unit is made to turn through its full angle of travel while the first remains at rest. By rotating the shaft in the reverse direction, the reverse sequence is made to take place.

Accordingly, a general object of the present invention is to provide a sequence coupled system incorporating at least one rotary electrical device.

Another object of the invention is to provide a sequence coupled system having dial indication coordinated with the operation of the rotary devices.

Still another object of the invention is to provide a compact system of rotary electrical devices.

One well known type of rotary electrical device is the rheostat; and a common use of rheostats is in motor speed control. For combined armature and field speed control of a D.C. shunt wound motor, a pair of rheostats are normally employed in a direct coupled assembly. By the direction coupling procedure, both of the rheostat contacts are made to move in unison. Consequently, it becomes necessary to spread the resistance windings over opposite halves of the two rheostats, the remaining half of each rheostat being a short circuit. With this arrangement, for a half rotation of the shaft, resistance is inserted in the armature circuit to reduce the speed; and for the other half rotation of the shaft, resistance is inserted in the field circuit to increase the speed. At the center position where both rheostats are connected to the short circuit portion of their path, no resistance is inserted in either circuit. Because of the necessary short circuit paths, direct coupled rheostats waste approximately 50% of their space allotment.

Therefore, an important object of the present invention is to provide an improved rheostat arrangement which overcomes the limitations of the prior art by occupying approximately one-half the space required for prior art devices of equivalent wattage.

A further object of the invention is to provide an improved rheostat arrangement by which the tapered rheostat having a very high ratio of maximum current to minimum current is obtained.

A yet further object of the invention is to provide an improved mechanical arrangement for electrical systems which permits electrical connection of several variable resistance elements so as to secure better resolution.

A still further object of the invention is to provide electrical apparatus comprising rheostats coupled in sequence.

Additional objects and features of the invention pertain to the particular structure and arrangements whereby the above objects are attained.

A structure in accordance with the invention includes a number of rotary devices and means, including a detent, mechanically coupling the rotary devices for operation in sequence.

The invention, both to its structure and mode of operation, will be better understood by reference to the following disclosure and drawings forming a part thereof, wherein:

FIG. 1 is a partially broken away, perspective view of two rheostats sequence coupled in accordance with the invention;

FIG. 2 is a somewhat enlarged, back end view of the rheostat arrangement of FIG. 1;

FIG. 3 is a schematic electrical diagram showing the rheostat arrangement of FIG. 1 connected for combined armature and field speed control of a D.C. shunt wound motor;

FIG. 4 is a schematic electrical diagram showing a tapered rheostat arrangement connected in accordance with the invention to provide a very high ratio of maximum current to minimum current;

FIG. 5 is a schematic electrical diagram showing sequence coupled potentiometers arranged to provide improved resolution and to provide a wattage in excess of that available in a single potentiometer arrangement of equivalent, physical size;

FIG. 6 is an enlarged view, partially broken away and partially in section, taken through the section 6—6 of FIG. 2;

FIG. 7 is a further enlarged, fragmentary side view, partially in invisible outline, of the detent arrangement employed in sequence coupling the rheostats shown in FIG. 6, the detent arrangement being shown in the position which is achieved just prior to transition;

FIG. 8 is a view through the section 8—8 of FIG. 7;

FIG. 9 is a view, partially in invisible outline, of the detent arrangement of FIG. 7, the detent arrangement being shown in the position which is achieved immediately after transition;

FIG. 10 is a view through the section 10—10 of FIG. 9;

FIG. 11 is an exploded perspective view of the dial arrangement used on the sequence coupled system of FIG. 1;

FIG. 12 is a front elevational view of the dial arrangement showing the parts positioned for the start of operation;

FIG. 13 is a view similar to the showing of FIG. 12 but illustrating the position of the parts as they would appear upon completing the cycle of operation of the first rheostat;

FIG. 14 is a view similar to the showing of FIG. 12 but illustrating the position of the parts during transition from one rheostat to the other;

FIG. 15 is another view similar to the showing of FIG. 12 but illustrating the position of the parts upon starting the operation of the second rheostat;

FIG. 16 is an enlarged view taken through the section 16—16 of FIG. 14;

FIG. 17 is an enlarged view taken through the section 17—17 of FIG. 14;

FIG. 18 is an enlarged perspective view of the lever used in the dial arrangement of FIG. 11; and FIG. 19 is a view of a rotary electrical unit sequence coupled to a fluid control valve.

One important use of sequence coupling is in the art of rheostats; and hereinafter, such art will be used for purposes of explanation and illustration without intending to limit the applications and uses of the invention in any way.

Referring now in detail to the drawings, specifically to FIG. 1, a sequence coupled rheostat arrangement shown generally at 20 includes a support structure 21, bracket 22 and a dial indicator 23. A primary rheostat 24 and a secondary rheostat 26 are fastened to bracket 22 in coaxial alignment; and as will be brought out more fully hereinbelow, rheostats 24 and 26 are arranged to be controlled individually and selectively by means of a solid shaft 28 which extends freely through structure 21 and through bracket 22 in order to engage and operate a detent arrangement 30. Bracket 22 and support structure 21 are ordinarily fixed with respect to each other by some suitable means such as screws.

In accordance with the drawings, a knob arrangement 32 is affixed to one end of shaft 28 to implement manual operation of the rheostat arrangement 20. However, shaft 28 may be equally well operated by a motor to which it may be coupled by suitable means such as a gear train. The operation of such a motor can readily be programmed in accordance with some desired mode of altering the electrical resistance afforded by the rheostats 24 and 26.

As is best shown in FIG. 6, bracket 22 is made of a U-shaped frame 34 and a C-shaped cross-piece 36 fastened together with screws 38.

Continuing with reference to FIG. 6, the primary rheostat 24 includes an electrical resistance element 40 wound on a porcelain core 42, core 42 advantageously taking annular form. As will be recognized, element 40 may be wound to provide a tapered resistance or it may be wound uniformly. Furthermore, the porcelain core 42 is provided with hexagonal-shaped recesses 44. These recesses cooperate with nut-and-bolt arrangements 46 and with a mounting plate 48 in securing rheostat 24 to the bracket 22.

Mounting plate 48 is centrally fashioned to present a hollow cylindrical bushing portion 50 which acts as a locater for a coiled compression spring 52 and which acts as a guide for a hollow shaft or sleeve 54 that extends rotatably through bushing portion 50. In order to prevent axial movement of sleeve 54, a fixed washer 56 is silver soldered or otherwise suitably fastened about sleeve 54 adjacent one end. Advantageously, a thrust washer 58 is interposed between fixed washer 56 and a shoulder portion 60 of mounting plate 48.

Adjacent the other end of sleeve 54, a thick-walled metal collar 62 is secured to the sleeve in non-rotatable relationship as by a set screw 64. Collar 62 is provided with prongs 66 which enter corresponding axial grooves 68 in a porcelain drive hub 70. Engagement of the prongs 66 with the grooves 68, and therefore positive positioning of the porcelain drive hub 70 relative to the metal collar 62, is insured by means of spring 52 biasing a formed washer 72 against a porcelain spacer 74.

A resilient contact arm 76 disposes a washer-shaped end portion 78 between the porcelain spacer 74 and the porcelain drive hub 70 to urge an electrically conductive plate 79 into intimate and electrical contact with a centrally apertured plate 80. Plate 80 terminates in a center tap 81 indicated in FIGS. 1 and 2, whereas conductive plate 79 carries lead wires 82 which make connection with a brush-type contact 84, contact 84 being supported against resistance element 40 by a formed end 86 of contact arm 76.

In order to insure rotation of contact arm 76 in unison with rotation of porcelain drive hub 70, the arm 76 is slotted in order to receive tongues 88 which extend radially from the hub 70.

The secondary rheostat 26 is constructed and arranged in somewhat similar manner to primary rheostat 24. Accordingly, like numerals have been used to designate like elements, the suffix letter "a" being employed to distinguish the elements associated with secondary rheostat 26.

Unlike the arrangement of primary rheostat 24, however, sleeve 54a of secondary rheostat 26 extends beyond mounting plate 48a to have secured adjacent its one end a metal collar 62a which confronts the collar 62. As a consequence, the need for prongs, such as prongs 66, is eliminated in collar 62a.

Spring 52a biases a fixed washer 56a against mounting plate 48a. Furthermore, a split hub 90 is securable near the opposite end of sleeve 54a in order to urge the porcelain drive hub 70a, the porcelain spacer 74a and the associated elements against the bias of spring 52a, split hub 90 being fastened to hub 70a in a suitable manner.

Turning now to FIGS. 7–10 for a more detailed description of detent 30, the collar 62 is shown confronting the collar 62a; and as will be observed, collar 62 is provided with an inclined notch or cam surface 92 extending axially inwardly from one end face. Collar 62a has a similar but oppositely inclined notch or cam surface 94. A pin 96, is radially affixed to a mid-portion of shaft 28 in order to extend selectively into the notches 92 and 94. If desired, a roller 98 can be mounted on pin 96 to facilitate its operation in notches 92 and 94.

Since shaft 28 extends slidably and rotatably through the sleeves 54 and 54a and since collar 62 and collar 62a are arranged to be rotatable relative to each other, roller 98 can be confined in notch 92 beneath the end face 100 of collar 62a whereby rotation of shaft 28 in the direction generally indicated by arrow 102 will result in a driving of collar 62 in the same general direction. Continued rotation of shaft 28 in this direction will eventually bring notch 92 into alignment with notch 94, as is shown in FIG. 7.

This position denotes the transition stage since continued rotation of shaft 28 in the direction indicated by arrow 102 will cause roller 98 to ride-up the incline 104. This movement will cause shaft 28 to shift axially a distance "d" in the general direction of arrow 106 whereby roller 98 will be relocated in notch 94, as is generally indicated in FIG. 9.

Continued rotation of shaft 28 in the direction of arrow 102 will cause roller 98 to drive the collar 62a, roller 98 being confined against the surface 108 of collar 62.

A reversing of the rotation of shaft 28 will result in a reverse operation of the detent 30.

It has proved advantageous to fashion slots 92 and 94 with tooth-like appendages 110 and 112 respectively. These appendages cooperate in guiding the roller 98 through the transition stage and furthermore serve to block movement of roller 98 at the end points of shaft rotation. Assisting in defining these end points of travel are posts 114 and 114a upraised coaxially with each other from mounting plates 48 and 48a respectively, as shown in FIG. 6. Posts 114 and 114a serve to block rotation of sleeves 54 and 54a respectively by confronting cooperating projections 116 and 116a which are integrally secured to washers 56 and 56a.

For purposes of affording a more complete understanding of the invention, it is important now to state how the component parts thus far identified operate. Assuming that sliding contacts 84 and 84a are disposed at their starting positions where they incorporate no resistance in the circuits and assuming that rheostats 24 and 26 are connected as is desired through terminals 120, 122, 120a, 122a, 81 and 81a, resistance may be added to the circuit in desired increments by manually rotating the knob arrangement 32 and thereby shaft 28 in the direction which has been indicated by arrow 102.

This rotation of shaft 28 will cause roller 98 to drive the collar 62 as hereinabove described. Since collar 62 is securely fastened to sleeve 54, this driving of collar 62 will cause sleeve 54 to rotate; and since collar 62 is secured to porcelain drive hub 70 by prongs 66, the rotation of collar 62 will cause contact arm 76 to rotate, whereby contact 84 will be repositioned upon the resistance element 40.

Accordingly, a resistance circuit will be created from the center tap 81, through the plate 80 to the plate 79, thorugh the lead wires 82 to the contact 84, and thence through the resistance element 40 to terminal contact 120.

Continued rotation of knob arrangement 32 and shaft 28 will cause continued driving of the collar 62 and the contact arm 76, whereby increasing amounts of resistance will be brought into the circuit. Eventually, contact arm 76 will reach the end of its travel as defined by projection 116 encountering post 114 and contact 84 reaching terminal 122. Furthermore, at this latter point, the transition stage will be achieved and continued rotation of shaft 28 will cause roller 98 to leave collar 62 and be relocated so as to drive collar 62a.

Rotation of shaft 28 will now cause collar 62a to rotate; and since collar 62a is secured to sleeve 54a, sleeve 54a and its associated parts will also rotate. Contact arm 76a, being secured to porcelain drive hub 70a which is secured to sleeve 54a by means of split hub 90, is thus driven in its travel about resistance element 40a.

In this condition, resistance is gradually added to the circuit extending from terminal 120a through the resistance element 40a to the contact 84a, thence through the lead wires 82a to the plate 79a, thence to the plate 80a and the center tap 81a. When contact arm 76a reaches the end of its travel, further movement of sleeve 54a will be blocked by projection 116a encountering post 114a; and the full resistance available from both rheostats will be incorporated in their respective circuits.

It is to be recognized that reverse rotation of shaft 28a from this point will result in a gradual diminishing of the resistance incorporated through rheostat 26 until all of that resistance is withdrawn and the transition point is once again achieved.

Continued reverse rotation of the shaft 28 will gradually reduce the resistance incorporated by means of rheostat 24a until finally all of that resistance is withdrawn from its circuit and the initial condition is restored.

In order that a thorough understanding of the invention may be had, it is advantageous to provide at this juncture a description of sequence coupled rotary devices described as embodied in specific systems. Turning therefore to FIG. 3, the rheostats 24 and 26 are shown employed for speed control of a D.C. shunt wound motor, being employed to control the field 132 and the armature 130 respectively.

In a conventional direct coupled rheostat arrangement, control of armature 130 and field 132 would be available only through those portions of the windings extending from point 134 to point 136 and from point 138 to point 140. Using the instant invention, the entire winding is available for control. Hence, each rheostat can be made approximately half the size which would be required for direct coupling.

In FIG. 4, two rheostats, rheostats 24t and 26t, are shown sequence coupled in tandem to provide, for example, a tapered 6,000 ohm rheostat. To provide such a rheostat, rheostat 24t would conveniently comprise sections of 20, 40, 98, 355 and 914.5 ohms while rheostat 26t would comprise a single section of 4,572.5 ohms. With a line current of 245 volts and a fixed resistance 142 of 98 ohms, the ratio of $I_{max}/I_{min}$ is 62. Under these conditions, rheostat 24t may be conveniently wound on a so-called model T core whereas rheostat 26t may be wound on a smaller, so-called model L core. Using direct coupling such a tapered rheostat arrangement could not be satisfactorily wound on cores of this size.

In FIG. 5, two potentiometers, potentiometer 24p and potentiometer 26p, are shown coupled in sequence and electrically connected in series employing a double throw switch 144. Such a potentiometer arrangement is characterized by improved resolution and may be adapted to provide wattages in excess of those available in a single potentiometer by arranging switch 144 to open one circuit and close the other circuit at the transition point of the sequence coupling.

It is also to be recognized that three or more variable resistance devices may be sequence coupled by extension of the principles of the invention.

In FIG. 19, a rheostat 24r is shown coupled in sequence with a valve arrangement 146. It will be observed that elements similar to those hereinabove described are identified in FIG. 19 by similar reference numerals to which the suffix letter "r" has been affixed. Sequence coupling of a rheostat to a valve arrangement, such as is illustrated in FIG. 19, is useful in process control system; and valve arrangement 146 may be devised to control the flow of fluid materials or the flow of a processing fluid such as hydraulic oil through a conduit 148. The valve arrangement 146 may comprise a globe valve or a gate valve or some other type of valve unit operative upon rotation of a shaft. Therefore and because the present invention does not reside in the details of the valve arrangement 146, such details are not shown in the drawings nor will they be described herein.

Turning now to FIGS. 11–18 for a detailed description of the dial indicator 23 and referring first to FIGS. 11 and 16, the dial indicator 23 will be seen to include a pointer element 150, a lever element 152, a front plate member 154 and a rear plate member 156. The pointer element 150 is fastened to a hub 158 of the knob arrangement 32 by some suitable means such as screws, not shown. The pointer element 150 also incorporates an aperture 160 which is aligned with the bore in hub 158 for passing shaft 28 into the hub where it is secured by means of a set screw 162. A pin 164 extends rearwardly from the pointer element 150 offset from and in a direction generally parallel to the shaft 28, pin 164 being held in place by being welded to the pointer element, by passing through an aperture in the pointer element to be driven into the hub 158 or by other suitable means. Pin 164 cooperates with lever element 152 in a manner which will become apparent hereinafter.

The front plate member 154 is provided with a central aperture 166 for passing the shaft 28, the front plate member 154 being rigidly secured to the support structure 21 by means of screws 168 or other fastening means. As is particularly well shown in FIG. 16, front plate member 154 is provided with rearwardly extending bosses 170 which abuttingly engage the support structure 21 and which are held in such engagement by means of the screws 168. With reference to FIGS. 11 and 17, the bosses 170 will be seen provided with elongated slots 172 for passing the screws 168. The front plate member 154 is additionally fashioned with a number of apertures 174 situated adjacent its periphery and disposed at equal, angular intervals, the apertures 174 serving a purpose which will soon become apparent.

The rear plate member 156 is rotatably or arcuately shiftably mounted between the front plate member 154 and the support structure 21, plate member 156 being provided with a central aperture 176 which passes the shaft 28. Furthermore, the rear plate member 156 defines two moderate sized cutaway portions 178, the bosses 170 of front plate member 154 passing through the portions 178 with sufficient clearance to permit the desired arcuate shiftability of the rear plate member 156. The cutaway portions 178 are shown taking circular shape; however, they may take other shapes, such as for example the shape of arcuate slots.

A number of radial indicia 180 are disposed adjacent the edge of the rear plate member 156, and these radial indicia 180 are spaced apart at equal, angular intervals. The indicia 180 cooperate with two sequences of consecutive numbers shown radially inwardly situated on the plate 156 in FIG. 11. The numbers and the cooperating indicia form two circular scales arcuately offset from each other on the single dialface defined by the rear plate 156. These two scales are associated respectively with the primary rheostat 24 and the secondary rheostat 26.

The first scale which is associated with primary rheostat 24 is specifically shown as running in increments of ten from zero to one-hundred; specific numeric values may represent ohms or they may represent some arbitrary value associated with a given particular use of the rheostat arrangement. The second scale which is associated with the secondary rheostat 26 is shown as running in increments of ten from one-hundred to two-hundred; and these latter values desirably represent the same kind of values represented by the numeric values on the first scale. It will be noted that the numerals of the second scale are disposed clockwise subsequent to the numerals of the first scale. Moreover, a blank area 182 is provided between the beginning and end of each scale. The purpose of so arranging the scales will be described hereinafter. It will be recognized that the specific numerals shown on the rear plate member 156 are for purposes of illustration and in no way describe a limitation of the invention.

An arm or pin arrangement 184 extends axially forwardly from the rear plate member 156 spaced radially from the central aperture 176; and as is best shown in FIG. 16, the pin arrangement 184 includes a washer 186 which is disposed beneath the head of a rivet 188, the shank of rivet 188 passing through an aperture in rear plate member 156 to enter a tubular bushing 190. The bushing 190 grippingly receives the shank of rivet 188 in order to fix the rivet to the rear plate member 156. Continuing with reference to FIG. 16, the pin arrangement 184 extends freely through a hole 192 formed in the front plate member 154. The pin arrangement 184 extends beyond the front plate member 154 into cooperative relationship with a U-shaped notch 194 fashioned in the end of lever element 152.

The lever element 152 is pivotally mounted to the front plate member 154 by means of a rivet arrangement 196. The arrangement 196 includes an antifriction washer 198 and a washer 200 sandwiching the front plate member 154, further including a rivet 202 which passes through a hole 204 formed in the lever element 152, as is shown in FIGS. 16 and 18.

Proceeding now with particular reference to FIG. 18, the lever element 152 will be seen fashioned with a doubly toothed end portion 206, the teeth 208 of which define there between a V-shaped notch 210. It is to be pointed out that the double toothed end portion 206 is offset from the plane of the lever element 152 in order to cooperate with the pin 164 as is shown in FIG. 16.

The pin arrangement 184, the lever element 152 and the pin 164 comprise a mechanical transfer arrangement which is operative between the shaft 28 and the rear plate member 156. By means of this mechanical transfer arrangement, arcuate shifting of the member 156 is realized; and this arcuate shifting is controlled to expose the numerals of either of the two scales hereinabove described, the scales being exposed to view through the ports or apertures 174, the particular scale being exposed at any one time being the scale which is associated with the rheostat that is being operated at the given instant.

So that this latter functional aspect of the invention may be more readily comprehended, a detailed discussion of the operation of dial indicator 23 will now be given with particular reference to FIGS. 12-15. Assuming as was done for the description of the operation of detent 30 that the sliding contacts 84 and 84a are disposed at their starting positions wherein none of the resistance from either resistance element 40 or resistance element 40a is incorporated in the external circuit, the pointer element 150, the lever element 152 and the rear plate member 156 will be situated relative to the front plate member 154 as is shown in FIG. 12. The numerals running from zero to one-hundred will be seen exposed to view through the apertures 174; and the pointer element 150 will be seen indicating zero resistance being incorporated in the external circuit. It will be noted that the pin 164 is disposed outside of the notch 210 and clockwise subsequent to the toothed end 206 of lever element 152 in this position. Accordingly, upon rotation of shaft 28 in the direction of arrow 102, i.e. in a generally clockwise direction as viewed in FIG. 12, the lever element 152 will remain as shown while the pointer element 150 traverses the first circuit of revolution which circuit of revolution is associated with operation of the primary rheostat 24. As will be recognized, the pointer element 150 will cooperate with the graduated indicia 180 and with the exposed numerals in providing an indication of the amount of resistance incorporated in the external circuit for any given position of the shaft 28.

When the pointer element 150 reaches the end of its first cycle of operation, the several parts will be situated as is shown in FIG. 13. The pointer element 150 will indicate the maximum resistance available from primary rheostat 24, and the pin 164 will have passed over the tip of one of the teeth 208 as illustrated. Thereafter and while the roller 98 is being resituated from notch 92 into notch 94, the continued rotation of shaft 28 in the direction indicated generally by arrow 102 will cause pin 164 to be confined in notch 210 and thereafter will cause a pivoting of the lever element 152 from the position shown in FIG. 13 to that shown in FIG. 14. As the lever element thus pivots relative to the front plate member 154, the rear plate member 156 will be caused to shift arcuately in the direction indicated by arrow 212, notch 194 of lever element 152 acting on pin 184 to achieve this relocation.

While pointer element 150 is traversing the blank area 182 between the starting and ending points of the two scales, shaft 28 will be shifting axially rearwardly the distance "d" as has been described hereinabove. Accordingly, the pointer element 150 is normally spaced axially forwardly of the toothed end 206 of lever element 152 by a distance "e" as is shown in FIG. 16. The distance "e" is desirably somewhat greater than the distance "d" to prevent binding of the pointer element 150 against the lever element 152 when the shaft 28 has been shifted axially rearwardly. It will be noted that the dial indicator 23 and the detent 30 thus share a common hiatus in positive operation while the pointer element 150 is traversing the blank area 182 and while the shaft 28 is shifting axially.

Completion of the transition from rheostat 24 to rheostat 26 and from the lower register scale to the upper register scale will become apparent from a comparison of FIGS. 14 and 15. It will be noted that, when the upper register scale has been positioned so that the corresponding numerals are exposed to view through the aperture 74, the pin 164 will have pivoted the lever element 152 and will have ridden out of the notch 210. In this position the pointer element 150 will be indicating the total resistance available from rheostat 24, i.e. the maximum value from the lower scale and the minimum value on the second scale.

Subsequent movement of the pointer element 150 in the direction of arrow 102 as occasioned by rotation of shaft 28 will proceed until the end of the second cycle is completed.

Reverse rotation of the shaft 28 will result in a reverse operation of the dial indicator 23.

The specific examples herein shown and described should be considered illustrative only. Various changes in structure may occur to those skilled in the art; and such changes are to be understood as forming a part of this invention insofar as they fall within the true spirit and scope of the appended claims.

The invention is claimed as follows:

1. A system comprising: a plurality of devices of specific function, each of said plurality of devices having a first portion fixed relative to first portions of the other of said devices and each of said plurality of devices having a second portion responsive to a shaft position for varying the effect of said device; rotatable shaft means; means for mechanically coupling the second portions of said devices to said shaft means individually and in a predetermined sequence; dial indicator means including a pointer element movable in cooperation with said shaft means, a plurality of graduated scales each of which is individually associated with one of said devices, a first member fixed with respect to said first portions and a second member arcuately shiftable with respect to said first member; and mechanical transfer means operative between said shaft means and said second member for shifting said second member upon coupling of one of said devices to said shaft means, shifting of said second member exposing the scale which is associated with said coupled device for coaction with said pointer element.

2. A system comprising: a plurality of devices of specific function, each of said plurality of devices having a first portion fixed relative to first portions of the other of said devices and each of said plurality of devices having a second portion responsive to a shaft position for varying the effect of said device; rotatable shaft means; pin means eccentrically fixed with respect to said shaft means and extending parallel thereto; means for mechanically coupling the second portions of said devices to said shaft means individually and in a predetermined sequence; dial indicator means including a pointer element movable in cooperation with said shaft means, a plurality of graduated scales each of which is individually associated with one of said devices, a first member fixed with respect to said first portions and a second member arcuately shiftable with respect to said first member; mechanical transfer means operative between said shaft means and said second member for shifting said second member upon coupling of one of said devices to said shaft means, shifting of said second member exposing the scale which is associated with said coupled device for coaction with said pointer element, said transfer means including a lever element pivotally mounted on said first member and having a toothed end cooperatively engageable by said pin means, said lever element further having means adjacent its other end for transmitting arcuate movement to said second member.

3. A system according to claim 1 wherein said second member carries said scales, said scales being arcuately offset from each other, and wherein said first member defines ports for viewing the scale which is to be exposed for coaction with said pointer element.

4. A system comprising: a plurality of devices of specific function, each of said plurality of devices having a first portion fixed relative to first portions of the other of said devices and each of said plurality of devices having a second portion responsive to a shaft position for varying the effect of said device; rotatable shaft means; means for mechanically coupling the second portions of said devices to said shaft means individually and in a predetermined sequence, said mechanical coupling means including collar means fixed to each of said second portions, each of said collar means having a notch opening axially therefrom, said notch being inclined with respect to the axis of the corresponding collar means, said mechanical coupling means further including means on said shaft means extending radially therefrom to engage said collar means selectively at the notches thereof for locking a collar means so engaged to said shaft means.

5. A system comprising: a plurality of devices of specific function, each of said plurality of devices having a first portion fixed relative to first portions of the other of said devices and each of said plurality of devices having a first portion fixed relative to first portions of the other of said devices and each of said plurality of devices having a second portion responsive to a shaft position for varying the effect of said device; rotatable and axially shiftable shaft means; and means for mechanically coupling the second portions of said devices to said shaft means individually and in a predetermined sequence, said mechanical coupling means including collar means fixed to each of said second portions, each of said collar means having a notch opening axially therefrom said notch being inclined with respect to the axis of the corresponding collar means, said mechanical coupling means further including means on said shaft means extending radially therefrom to engage said collar means selectively at the notches thereof for locking a collar means so engaged to said shaft means, axial shifting of said shaft means engaging and disengaging said radially extending means and said collar means in said sequence.

6. An electrical system comprising: a plurality of rotary electrical devices, each of which includes an electrical element and a sliding contact; and means for mechanically coupling said electrical devices for operation in sequence, said means including bracket means supporting said rotary electrical devices, shaft means extending rotatably and axially shiftably through said bracket means, and means arranged with said shaft means to connect and disconnect said shaft means and said sliding contacts for repositioning said contacts on said electrical elements individually and exclusively in a predetermined, reversible sequence.

7. Electrical apparatus comprising: a bracket; a first resistance element secured to said bracket; a first sleeve aligned within said first resistance element; a first sliding contact operably associated with said first resistance element; a first collar having a cam element, said collar being fastened to said first sleeve; a second resistance element secured to said bracket in spaced-apart, coaxial relationship with said first resistance element; a second sleeve aligned within said second resistance element; a second sliding contact operably associated with said second resistance element; a second collar having a cam element arranged to cooperate with the cam element of said first collar, said second collar being fastened to said second sleeve; means biasing said collars into abutment; and a shaft extending slidably and rotatably through said bracket to dispose locking means in selective, operable relationship with said cam elements, whereby rotation of said shaft causes rotation of the sleeve which corresponds to the collar with which locking means is associated.

8. Electrical apparatus comprising: a bracket; a first resistance element secured to said bracket; a first sleeve aligned within said first resistance element; a first sliding contact operably associated with said first resistance element and affixed to said first sleeve to rotate therewith; a first collar having a cam element adjacent one end, said collar being fastened to one end of said first sleeve; a second resistance element secured to said bracket in spaced-apart, coaxial relationship with said first resistance element; a second sleeve aligned within said second resistance element; a second sliding contact operably associated with said second resistance element and affixed to said second sleeve to rotate therewith; a second collar having a cam element adjacent one end arranged to cooperate with the cam element of said first collar, said second collar being fastened to one end of said second sleeve; and a shaft extending slidably and rotatably through said bracket and through said sleeves to dispose locking means in selective, operable relationship with said cam elements, whereby rotation of said shaft causes rotation of the sleeve which corresponds to the collar with which said locking means is associated.

9. Electrical apparatus comprising: a bracket; a first resistance element wound on an annular core and secured to said bracket; a first sleeve aligned coaxially within said first resistance element; a first sliding contact operably associated with said first resistance element and affixed to said first sleeve to rotate therewith; a first collar having a cam element adjacent one end, said collar being fastened to one end of said first sleeve; a second resistance element wound on annular core and secured to said bracket in spaced-apart, coaxial relationship with said first resistance element; a second sleeve aligned coaxially within said second resistance element; a second sliding contact operably associated with said second resistance element and affixed to said second sleeve to rotate therewith; a second collar having a cam element adjacent one end arranged to cooperate with the cam element of said first collar, said second collar being fastened to one end of said second sleeve; and a shaft extending slidably and rotatably through said bracket and through said sleeves to dispose locking means in selective, operable relationship with said cam elements, whereby rotation of said shaft causes rotation of the sleeve which corresponds to the collar with which said locking means is associated.

10. Electrical apparatus comprising: a bracket; a first resistance element wound on an annular core and secured to said bracket by a mounting plate; a first sleeve aligned coaxially within said first resistance element; a first sliding contact operably associated with said first resistance element and affixed to said first sleeve to rotate therewith; a first collar having an inclined notch opening toward one end, said collar being fastened to one end of said first sleeve; a second resistance element wound on an annular core and secured to said bracket by a mounting plate in spaced-apart, coaxial relationship with said first resistance element; a second sleeve aligned coaxially within said second resistance element; a second sliding contact operably associated with said second resistance element and affixed to said second sleeve to rotate therewith; a second collar having an inclined notch opening toward one end arranged to cooperate with the notch of said first collar, said second collar being fastened to one end of said second sleeve; and a shaft extending slidably and rotatably through said bracket and through said sleeves to dispose a pin-and-roller member in selective, operable relationship with said cam elements, whereby rotation of said shaft causes said pin-and-roller member to drive said first collar repositioning said first sliding contact selectively through its full travel, whereby continued rotation of said shaft causes said shaft to shift axially resulting in said pin-and-roller member driving said second collar to reposition said second sliding contact selectively through its full travel, and whereby reverse rotation of said shaft causes the reverse sequence to occur.

11. Electrical apparatus comprising: a bracket; a first resistance element wound on an annular core and secured to said bracket by a mounting plate; a first sleeve aligned coaxially within said first resistance element; a first sliding contact operably associated with said first resistance element and affixed to said first sleeve to rotate therewith; a first collar having an inclined notch opening toward one end, said collar being fastened to one end of said first sleeve; a second resistance element wound on an annular core and secured to said bracket by a mounting plate in spaced-apart, coaxial relationship with said first resistance element; a second sleeve aligned coaxially within said second resistance element; a second sliding contact operably associated with said second resistance element and affixed to said second sleeve to rotate therewith; a second collar having an inclined notch opening toward one end arranged to cooperate with the notch of said first collar, said second collar being fastened to one end of said second sleeve; means biasing said collars into abutment; and a shaft extending slidably and rotatably through said bracket and through said sleeves to dispose a pin-and-roller member in operable relationship with said cam elements, whereby rotation of said shaft causes said pin-and-roller member to drive said first collar repositioning said first sliding contact selectively through its full travel, whereby continued rotation of said shaft causes said shaft to shift axially resulting in said pin-and-roller member driving said second collar to reposition said second sliding contact selectively through its full travel, and whereby reverse rotation of said shaft causes the reverse sequence to occur.

12. Electrical apparatus comprising: a bracket; a first electrical element of arcuate form secured to said bracket; a first sleeve aligned coaxially with said first electrical element; a first sliding contact operably associated with said first electrical element and fixed to said first sleeve to rotate therewith; a first collar having a cam element adjacent one end, said collar being fastened to one end of said first sleeve; a second electrical element of arcuate form secured to said bracket in spaced-apart, coaxial relationship with said first electrical element; a second sleeve aligned coaxially with said second electrical element; a second sliding contact operably associated with said second resistance element and affixed to said second sleeve to rotate therewith; a second collar having a cam element adjacent one end arranged to cooperate with the cam element of said first collar, said second collar being fastened to one end of said second sleeve; and a shaft extending slidably and rotatably through said bracket and through said sleeves to disposed locking means in selective, operable relationship with said cam elements, rotation of said shaft causing rotation of the sleeve corresponding to the collar with which said locking means is associated at the given moment.

13. An electrical system comprising: a plurality of variable resistance devices, each of which includes a resistance element and a sliding contact; and means mechanically coupling said resistance devices for operation in sequence, said means including bracket means supporting said resistance elements, shaft means extending rotatably through said bracket means, and means arranged with said shaft means for connecting said sliding contacts individually to said shaft means in sequence upon rotation of said shaft means in one direction and for disconnecting said sliding contacts individually from said shaft means in sequence upon reverse rotation of said shaft means whereby to reposition said contacts on said resistance elements.

14. An electrical system comprising: a plurality of variable resistance devices, each of which includes a resistance element and a sliding contact; and means mechanically coupling said resistance devices for operation in sequence, said means including bracket means supporting said resistance elements in fixed position relative to each other, shaft means extending rotatably through said bracket means, and detent means arranged with said shaft means for connecting said sliding contacts individually to said shaft means in sequence upon rotation of said shaft means in one direction and for disconnecting said sliding contacts individually from said shaft means in sequence upon reverse rotation of said shaft means whereby to reposition said contacts on said resistance elements, an additional contact being connected to or disconnected from said shaft means on completion of each full circle revolution thereof.

15. An electrical system comprising: a plurality of rheostats, each of which includes a resistance element and a sliding contact; and means mechanically coupling said rheostats for operation in sequence, said means including bracket means supporting said resistance elements in fixed position relative to each other, shaft means extending rotatably through said bracket means, and detent means arranged with said shaft means for connecting said sliding contacts individually to said shaft means in sequence upon rotation of said shaft means in one direction and for disconnecting said sliding contacts individually from said shaft means in sequence upon reverse rotation of said shaft means whereby to reposition said contacts on said resistance elements, an additional contact being connected to or disconnected from said shaft means on completion of each full circle revolution thereof.

16. A system comprising: a plurality of devices of specific function, each of said plurality of devices having a first portion fixed relative to first portions of the other of said devices and each of said plurality of devices having a second portion responsive to a shaft position for varying the effect of said device; first mechanical coupling means on each of said second portions, adjacent first coupling means having respective first coupling elements which are alignable in a given relative angular position corresponding with the respective beginning and end of travel of adjacent second portions of said devices; rotatable shaft means; and second mechanical coupling means on said shaft means, including a coupling element selectively engageable with a said first coupling element for driving the corresponding second portion and selectively transferable between adjacent first coupling elements only upon angular alignment thereof whereby mechanically to couple the second portions of said devices to said shaft means individually and in a predetermined sequence.

17. A system according to claim 16 wherein said plurality of devices includes at least one rotary electrical device.

18. A system according to claim 16 wherein said plurality of devices includes at least one rotary electrical device and at least one rotary mechanical device.

19. A system according to claim 18 wherein said rotary electrical device is a variable resistance device and wherein said rotary mechanical device is a valve.

References Cited in the file of this patent

UNITED STATES PATENTS

| | | |
|---|---|---|
| 2,069,440 | Hathorn | Feb. 2, 1937 |
| 2,277,883 | Rich | Mar. 31, 1942 |